United States Patent [19]

Johnson et al.

[11] Patent Number: 5,139,793
[45] Date of Patent: Aug. 18, 1992

[54] METHOD OF PROLONGING FLAVOR IN CHEWING GUM BY THE USE OF CINNAMIC ALDEHYDE PROPYLENE GLYCOL ACETAL

[75] Inventors: Sonya Johnson, Brookfield; Michael J. Greenberg, Northbrook, both of Ill.

[73] Assignee: Wm. Wrigley Jr. Company, Chicago, Ill.

[21] Appl. No.: 550,676

[22] Filed: Jul. 10, 1990

[51] Int. Cl.$^5$ ............................................. A23G 3/30
[52] U.S. Cl. ...................................... 426/3; 426/534; 426/535; 424/49
[58] Field of Search ................................. 426/3-6, 426/535, 534; 424/49

[56] References Cited

U.S. PATENT DOCUMENTS

| | | | |
|---|---|---|---|
| 3,818,107 | 6/1974 | Yolles | 426/538 |
| 3,857,964 | 12/1974 | Yolles | 426/534 |
| 3,862,340 | 1/1975 | Schreiber et al. | 426/65 |
| 3,879,425 | 4/1975 | Hall et al. | 260/340.9 |
| 3,898,283 | 8/1975 | Schreiber et al. | 260/566 R |
| 3,908,023 | 9/1975 | Schreiber et al. | 426/536 |
| 3,922,237 | 11/1975 | Schreiber et al. | 424/76 |
| 3,928,644 | 12/1975 | Schreiber et al. | 426/535 |
| 3,963,618 | 6/1976 | Muir | 210/500 M |
| 3,966,768 | 6/1976 | Pawloski | 260/338 |
| 4,031,140 | 6/1977 | Schreiber et al. | 260/611 A |
| 4,101,720 | 7/1978 | Taylor et al. | 526/3 |
| 4,190,602 | 2/1980 | Brunisholz et al. | 260/590 D |
| 4,206,301 | 6/1980 | Yolles | 426/533 |
| 4,360,606 | 11/1982 | Tobias et al. | 523/124 |
| 4,492,645 | 1/1985 | Sprecker et al. | 252/522 R |
| 4,571,344 | 2/1986 | Pittet et al. | 426/535 |
| 4,623,538 | 11/1986 | Pittet et al. | 424/49 |
| 4,626,599 | 12/1986 | Pittet et al. | 426/535 |
| 4,722,845 | 2/1988 | Cherukuri et al. | 426/5 |
| 4,804,002 | 2/1989 | Herron | 131/365 |
| 4,839,184 | 6/1989 | Cherukuri et al. | 426/3 |
| 4,845,156 | 7/1989 | Cohen | 525/259 |
| 4,863,745 | 9/1989 | Zibell | 426/5 |

OTHER PUBLICATIONS

John Suei-Thu Chou, "To find imitation flavor components contained in two yogurt (pineapple and strawberry) in the market", *American Chemical Society Abstracts*, vol. 23, 182728v (1987).

Steffen Arctander, Perfume and Flavor Chemicals (Aroma Chemicals), published by the author 1969, Montclair, N.J. (USA).

Heath, Henry B., M.B.E., B. Pharm. (London) Flavor Technology: Profiles, Products, Applications, 1978 The Avi Publishing Company, Inc., Westport, Conn.

Primary Examiner—Jeanette Hunter
Attorney, Agent, or Firm—Willian Brinks Olds Hofer Gilson & Lione

[57] ABSTRACT

A new chewing gum flavor ingredient, cinnamic aldehyde propylene glycol acetal (CAPGA), has been synthesized and has the structure displayed below. CAPGA is used in chewing gum compositions, particularly cinnamon and fruit-flavored gum. CAPGA also is used in a new method of making chewing gum, particular cinnamon and fruit-flavored gum. CAPGA is added to other food, drug or other oral compositions, including tooth paste. CAPGA also is used in a new method of making other food, drug or other oral compositions.

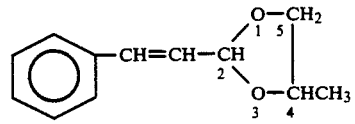

17 Claims, 3 Drawing Sheets

B
END

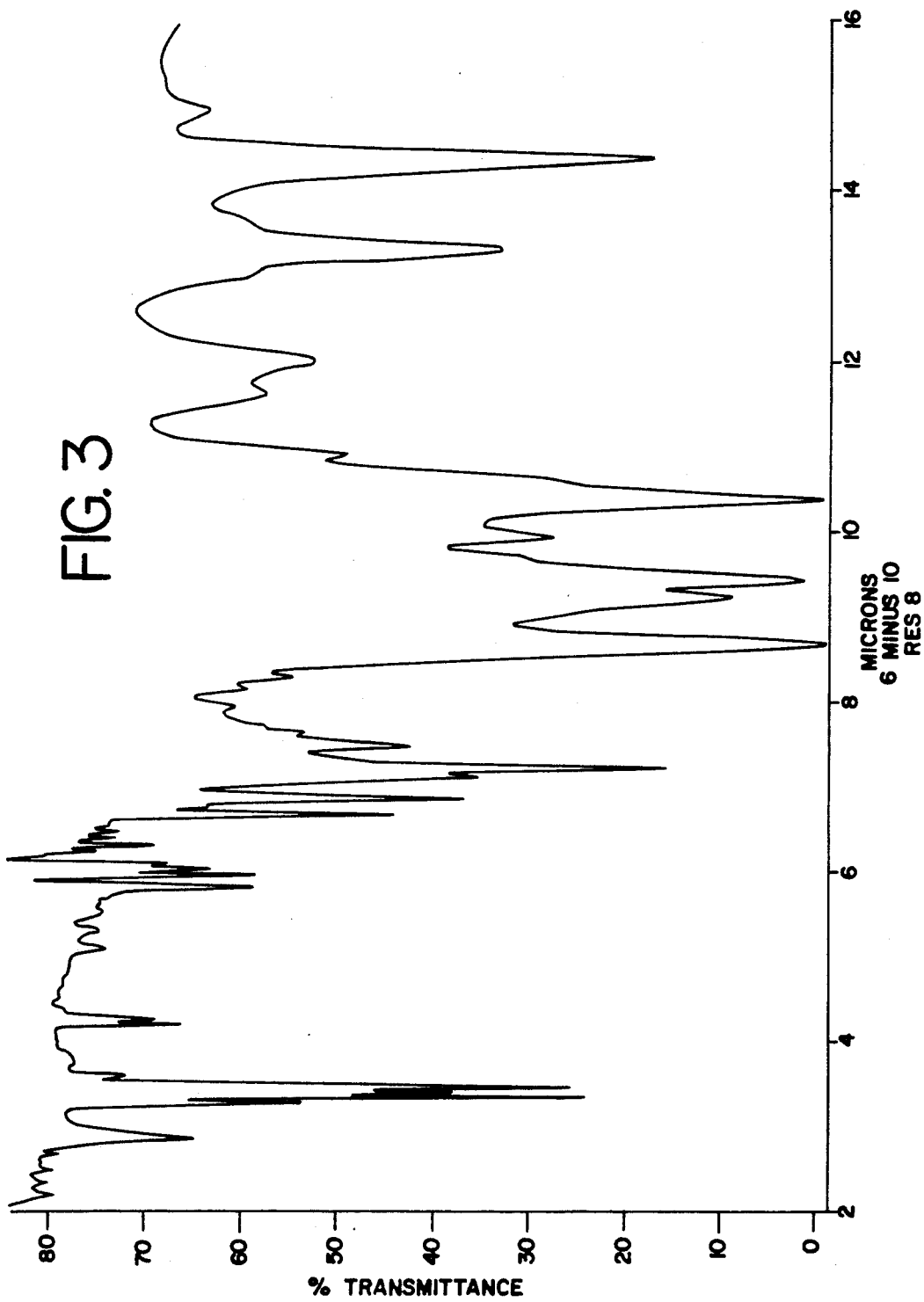

METHOD OF PROLONGING FLAVOR IN CHEWING GUM BY THE USE OF CINNAMIC ALDEHYDE PROPYLENE GLYCOL ACETAL

BACKGROUND OF THE INVENTION

The present invention relates to a new flavoring material, cinnamic aldehyde propylene glycol acetal (hereinafter "CAPGA"), and its use as a flavor ingredient. This chemical is also called 2-styryl-4-methyl-1,3-dioxolane, or 2-styryl-5-methyl-1,3-dioxolane. More particularly, the present invention relates to the use of CAPGA to prolong and enhance the flavor of chewing gum and other consumable items.

Cinnamic aldehyde is often the primary ingredient in cinnamon flavoring. Cinnamic aldehyde also is used to enhance fruit and many other flavors. Cinnamic aldehyde has been added to a variety of foods, including gum. In chewing gum, however, the cinnamic aldehyde flavor dissipates after only a few minutes of chewing. Methods of flavor prolongation, including the chemical combination of cinnamic aldehyde with other moieties, have been investigated.

On page 315 of West et al. "Synthetic Perfumes: Their Chemistry and Preparation," published by Edward, Arnold & Co., London, England, 1949, cinnamaldehyde dimethyl acetal is reported to "have a fine cinnamon-cassia odor which renders it useful in some Chanel-like fancy perfume and in oriental types like Tabac Blond and Fleur de Tabac." Cinnamaldehyde diethyl acetal also is discussed.

Cinnamaldehyde dimethyl acetal and diethyl acetal also were mentioned in "Perfume and Flavor Chemicals (Aroma Chemicals)" by Arctander, privately published in Montclair, N.J. in 1969. The dimethyl acetal was described as practically colorless, carrying little or none of the odor with which the free aldehyde is associated. The diethyl acetal was described as having a "faint but fresh green slightly spicy oily sweet odor and a mild and oily sweet taste" (Id. at 620). In his definitive work "Perfume and Flavor Chemicals", Arctander judged the diethyl acetal to be of little value in flavoring because like most other acetals, the diethyl acetal was unstable under mildly acid conditions.

Arctander also reported on cinnamaldehyde-2,4-dihydroxy-4-methyl-pentane acetal, describing it as having a "soft, tenacious, natural, cinnamon-type odor, not nearly as harsh as cinnamic aldehyde itself" (Id. at 621).

Arctander also reported on cinnamaldehyde ethylene glycol acetal, describing it as having a "sweet-spicy cinnamon-allspice taste, but not quite as sweet as the aldehyde" (Id. at 623). Arctander indicated that this latter acetal would be useful in flavor compositions, including all-spice, cassia, cinnamon, clove and various spice blends.

These cinnamaldehyde acetals were recognized as relatively unstable, especially in aqueous media, and thus were considered undesirable as perfume or flavor ingredients.

Acetals have been combined with other flavor chemicals to produce longer-lived chemicals. U.S. Pat. No. 3,898,283 (Schreiber et al.) teaches methods to produce phenyl pentenals, as well as their acetals.

U.S. Pat. No. 3,908,023 (Schreiber et al.) further teaches the production of cinnamon-like flavors with phenyl pentenals and their acetals. However, Schreiber points out that these chemicals are very stable, only hydrolyzing under "intense hydrolytic conditions." These conditions include a pH which is either under 2.5 or greater than 11.5, far different from the neutral pH of saliva. This reference teaches that 1,2- and 1,3-propylene glycol may be used in acetals to stabilize phenyl pentenals (col. 6, line 13).

U.S. Pat. No. 3,879,425 (Hall et al.) teaches that 3-phenyl,-4-pentenal ethylene acetal is a stable precursor for the aldehyde, which has a green floral fragrance. It teaches that a variety of phenyl pentenals, can be combined with a variety of acetals. A list of such acetals includes propylene glycol acetal (col. 9, lines 50–51).

U.S. Pat. No. 4,571,344 (Pittet et al.) teaches preparation of a sustained release flavor by combining dithioethers of phenyl alkenals with silica and propylene glycol (cols. 23 and 24). Pittet also teaches using the silica mixture in chewing gum (col. 24, lines 43–54). Pittet also reports long-lasting flavor with the dithioether flavor alone (col. 24, lines 58–64).

SUMMARY OF THE INVENTION

In accordance with one embodiment of the present invention, there is provided a chewing gum composition which includes gum base, softener, sweetener and flavor ingredients. The flavor ingredients are present at a level of about 0.1% to about 10% by weight of the chewing gum. The flavor ingredients include cinnamic aldehyde propylene glycol acetal.

In accordance with another embodiment of the present invention, there is a method of manufacturing a chewing gum which includes adding cinnamic aldehyde propylene glycol acetal (CAPGA) to the flavor ingredients which constitute about 0.1% to about 10% by weight of the chewing gum.

In accordance with another embodiment of the present invention, there is provided a food, drug or other oral composition which includes the chemical CAPGA as a flavor ingredient.

In accordance with another embodiment of the present invention, there is provided a method for altering the flavor of a food, drug or other oral composition which includes adding the chemical CAPGA to the food.

In accordance with another embodiment of the present invention, there is provided a new acetal, cinnamic aldehyde propylene glycol acetal, or CAPGA.

In accordance with another embodiment, there is provided a method for synthesizing CAPGA which includes condensation of cinnamic aldehyde with propylene glycol.

It has been unexpectedly discovered that the inclusion of cinnamic aldehyde propylene glycol acetal (CAPGA) in chewing gum flavor produces a longer-lasting flavor.

BRIEF DESCRIPTION OF DRAWINGS

FIG. 2 shows the results of gas chromatography alone.

FIG. 3 shows the results of infrared spectroscopy of CAPGA.

DETAILED DESCRIPTION OF PREFERRED EMBODIMENTS

Figure 1:
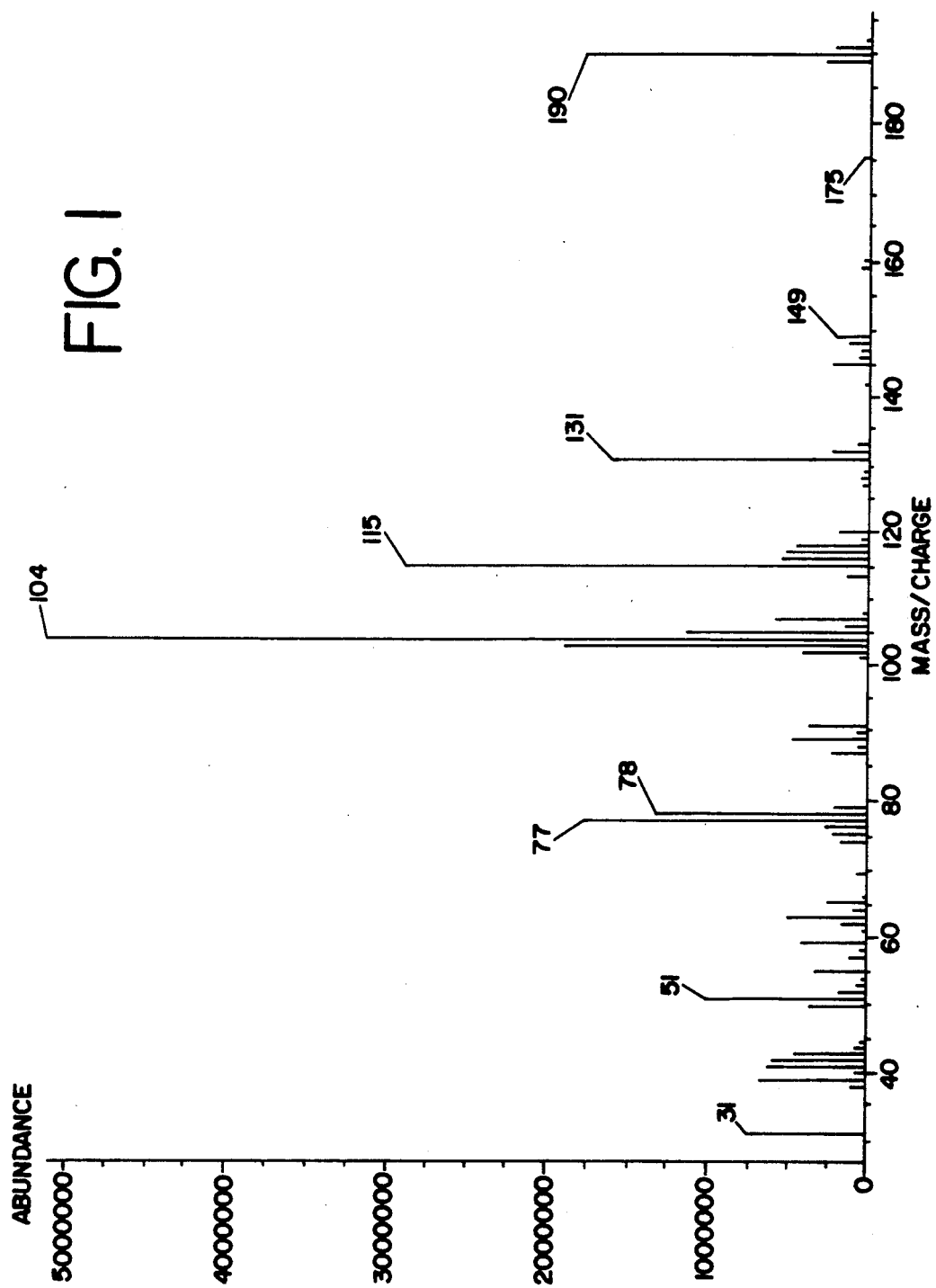
FIG. 1 shows the results of mass spectroscopy of CAPGA. The CAPGA was first separated from impurities by gas chromatography.

The present invention contemplates the acetal, CAPGA, which is produced by chemical reaction of cinnamaldehyde with 1,2-propylene glycol. CAPGA has the following structure:

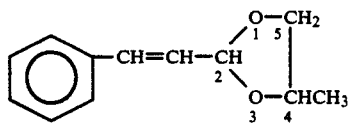

CAPGA is an oily liquid with a molecular weight of 190. CAPGA is practically insoluble in water but miscible in ethyl alcohol. Mass spectroscopy for this chemical is shown in FIG. 1, gas chromatography of this chemical is shown in FIG. 2, and infrared spectroscopy is shown in FIG. 3.

In accordance with the method of the present invention, CAPGA is synthesized by condensation of cinnamic aldehyde with propylene glycol.

Preferably, CAPGA is synthesized by the reaction of 1,2-propylene glycol with cinnamic aldehyde in the presence of a small quantity of acid and under anhydrous conditions.

Preferably, the cinnamaldehyde used in the reaction is relatively pure. More preferably, the cinnamaldehyde is of food-grade purity. Most preferably, the cinnamaldehyde is 99% pure. Typically, cinnamaldehyde is present as two cis/trans isomers. In the cis form, the phenyl and aldehyde groups are on the same side of the carbon-carbon double bond. In the trans configuration, the phenyl and aldehyde groups are on opposite sides of the carbon-carbon double bond. There is no known preference for either isomer, which are typically present at a level of about 95% to 99% trans isomer and 1% to 5% cis isomer.

Preferably, the acid used in the reaction is hydrochloric acid.

The reaction of propylene glycol with cinnamic aldehyde occurs at room temperature. Preferably, the temperature does not exceed 85° C. More preferably, the temperature is maintained at about 60°–75° C. when toluene is used as a solvent.

During the reaction, water is formed and is distilled off as an azeotrope with toluene. Any residual water may be removed by drying with sodium sulfate or other desiccant.

Simultaneously, excess toluene also is removed by known methods, which preferably may include a rotary evaporator, a vacuum oven or distillation. Most preferable is distillation.

The CAPGA produced by this method has about 3% residual cinnamaldehyde. Although methods exist to further refine and eliminate cinnamaldehyde, the residual cinnamaldehyde need not be removed because it is a compatible flavor ingredient.

The CAPGA produced by this method was analyzed for identity and purity. Samples were analyzed via direct injection gas chromatography/mass spectroscopy using the Hewlett Packard GC/MS consisting of a 5890 series GC, 5970B MSD, interfaced to Hewlett Packard 59940 data system of the HP-UX series. An electron multiplier voltage of 1600 electron volts was used. A Quadrapole mass filter was employed. The ionizing voltage was 70 electron volts. The column was an HP-PONA, crosslinked methyl silicone capillary column with a film thickness of 0.5 microns, an internal diameter of 0.21 millimeters and a length of 50 meters. The scan range was 30-300 amu, and the scan rate was 1.9 scans/second. Samples were injected in 1 microliter neat injections, split 80/1. The following chromatographic conditions were employed: temperature program of 70° C. to 220° C. at 3° C./minute; helium carrier; flow rate of 1 milliliter/minute; injection port temperature of 250° C.; and a run time of 80 minutes. The results of mass spectroscopy are shown in FIG. 1 and of gas chromatography in FIG. 2.

Because 95% to 99% of cinnamic aldehyde in the trans form, and because the number 2 and 4 carbons (as shown in the structure) are chiral centers, four peaks of CAPGA are detected by GC, cis and trans isomers each having two diastereomers. These are reflected in the peaks appearing in FIG. 2. The trans-cinnamic aldehyde elutes at 37.92 minutes; the minor fraction of cis-aldehyde acetal elutes at 40.62 to 40.72 minutes; the large fraction of trans-aldehyde acetal is at 52.22 to 52.70 minutes.

CAPGA may be analyzed to assure identity and purity. A variety of known methods may be used, including capillary gas chromatography, gas chromatography/mass spectroscopy, and infrared spectroscopy (IR). The results of infrared spectroscopy can be compared with those shown in FIG. 3. The contribution of residual cinnamaldehyde to the IR of FIG. 3 has been eliminated by known subtraction techniques.

The present invention contemplates the blending of CAPGA with many other flavor ingredients of food acceptable quality. Examples of flavor ingredients which may be blended with CAPGA include essential oils, synthetic flavors, or mixtures thereof, including but not limited to, oils derived from plants and fruits such as citrus oils, fruit essences, peppermint oil, spearmint oil, clove oil, anise and the like. Also exemplary of flavor blends which contain CAPGA are cinnamon and other spice and fruit flavors. Artificial flavor ingredients are also contemplated for blending with CAPGA. Those skilled in the art will recognize that natural and artificial flavor ingredients may be combined with CAPGA in any manner. All such flavor ingredients and blends are contemplated for use in the method of the present invention.

A presently preferred use for CAPGA is the incorporation of CAPGA into chewing gum. CAPGA may be mixed with the chewing gum ingredients at any time during the manufacturing process. More preferred is the addition of CAPGA to other flavor ingredients before incorporation into chewing gum ingredients; this contributes to better blending. Preferably, this flavor mixture is added to the chewing gum mixture near the end of the mixing process. If water-bearing ingredients are used, it is preferable that CAPGA be kept separate from such ingredients as long as possible to minimize hydrolysis of the acetal.

In general, a chewing gum composition comprises a water soluble bulk portion, a water insoluble chewable gum base portion and, typically, water insoluble flavor ingredients. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber, as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include beeswax and carnauba. The insoluble gum base constitutes between about 5 to about 95 weight percent of the gum. Preferably, the insoluble gum base comprises about 10 to about 50 weight percent of the gum, and more preferably about 20 to 30 weight percent. All percent values represent weight percent.

The gum base typically also includes a filler component. The filler component may be calcium carbonate, magnesium carbonate, talc, dicalcium phosphate, and the like. The filler may constitute between about 5 to about 60% of the gum base. Preferably, the filler comprises about 5 to 50% of the chewing gum base.

The gum base typically also contains softeners, including glycerol monostearate and glycerol triacetate. Further, gum bases may also contain optional ingredients such as antioxidants, colors and emulsifiers. The present invention contemplates employing any commercially acceptable gum base.

The water soluble portion of chewing gum may further comprise softeners, sweeteners, flavors and combinations thereof. The softeners are added to the chewing gum in order to optimize the chewability and mouth feel of the gum. Softeners, also known in the art as plasticizers or plasticizing agents, generally constitute about 0.1 to about 15% of the chewing gum. Softeners contemplated by the present invention include glycerin, lecithin and combinations thereof. Aqueous sweetener solutions such as those containing sorbitol, hydrogenated starch hydrolysates, corn syrup and combinations thereof may be used as softeners and binding agents in gum. Because of the potential hydrolysis of CAPGA, a preferred embodiment minimizes or eliminates these ingredients.

Sweeteners contemplated by the present invention for use in chewing gum include both sugar and sugarless components. Sugar sweeteners generally include saccharide-containing components commonly known in the chewing gum art which comprise but are not limited to sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol and the like, alone or in any combination. Also contemplated for direct addition to the gum are high intensity sweeteners such as aspartame, sucralose, cyclamate, acesulfame-K, dihydrochalcones, alitame and saccharin.

Those skilled in the art will recognize that any combination of sugar and/or sugarless sweeteners may be employed in the chewing gum. Further, those skilled in the art will recognize a sweetener may be present in a chewing gum in whole or in part as a water soluble bulking agent. In addition, the softener may be combined with a sweetener such as an aqueous sweetener solution.

The flavor ingredients contemplated by the present invention include flavor ingredients which are of food acceptable quality and are compatible with CAPGA. CAPGA flavor may be blended with other essential oils, synthetic flavor ingredients, or mixtures thereof, including but not limited to oils derived from plants and fruits such as citrus oils, fruit essences, peppermint oil, spearmint oil, clove oil, anise, cola, chocolate, vanilla and the like. Artificial flavor ingredients are also contemplated by the present invention. Those skilled in the art will recognize that the natural and artificial flavor ingredients may be combined in any manner.

In another embodiment, CAPGA may be added to chewing gum in which the flavor ingredients comprise from about 0.1% to about 10% of chewing gum. More preferably, the flavor ingredients comprise about 0.5% to about 5% of chewing gum. When used in chewing gum, the optimum level of CAPGA is preferably determined through sensory testing. The level is expected to vary widely depending on the type and level of gum base used, the type and level of flavor used, and other factors. CAPGA may be used at a level of about 0.01% to about 100% of the flavor ingredients. Preferably, the level of CAPGA is between about 0.1% and about 60% of the total flavor composition.

In another embodiment, the chewing gum includes cinnamon flavor ingredients at a level of about 0.1% to about 4% of the chewing gum. For cinnamon and other spice flavors, the level of CAPGA is at least about 0.01% of the total flavor composition but preferably at least 10% is used. Preferably, the level of CAPGA is about 60% of the flavor ingredients, depending on the results of sensory testing.

In still another embodiment, the chewing gum includes fruit flavor ingredients at a level of about 0.4% to about 2% of the chewing gum. In fruit-flavored gums, the preferred level will be about 0.01% to about 60% of the flavor ingredients. More preferred for fruit-flavored gums is a level of about 0.1% to about 1.2%. Most preferred for fruit-flavored gums is a level of about 0.4% to about 1.2%.

Other ingredients such as colors, emulsifiers, and pharmaceutical agents may be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with syrup and a portion of bulking agent. Further portions of the bulking agents may be added to the mixer. Under proper conditions, cinnamaldehyde propylene glycol acetal may be added at any time during the gum manufacturing process. Preferably, the flavor of the present invention is first added to other flavor ingredients. Preferably, the flavor ingredients are added to the gum mixture near the end of the mixing process.

The entire mixing procedure typically takes from about 5 minutes to about 15 minutes, but longer mixing times may sometimes be required.

In another embodiment, CAPGA may be used to flavor other foods, drugs or other oral compositions. Preferably, the flavor ingredients comprises from about 0.1% to about 10% of the oral composition. When used in oral compositions, the optimum level of CAPGA comprises from about 0.01% to about 60% of the flavor ingredients. In a particular embodiment, CAPGA is added to tooth paste.

Those skilled in the art will recognize that variations of the above described procedure may be followed. It is to be understood that an equivalent of changes and modifications of the embodiments described above are also contemplated by the present invention. The following examples are not to be construed as limitations upon the present invention, but are included merely as an illustration of various embodiments.

EXAMPLES

Example 1

CAPGA was synthesized using the following procedure:

1. 132 g cinnamic aldehyde was mixed with 100 g 1,2-propylene glycol, 100 ml toluene and 20 drops concentrated hydrochloric acid. This mixture and a stirring bar were placed in a 500 ml round-bottomed flask.
2. The flask was connected to a Dean Stark collecting tube and to a condenser packed with a drying tube. The flask was placed in a heating mantle connected to a rheostat and placed on a stir plate.
3. Water was circulated through the condenser. The stir plate was started, and the rheostat was set to medium speed. 22 ml of water was collected, which is slightly more than one mole, over a period of approximately 7 hours.
4. The sample remaining in the flask was neutralized and then dried with anhydrous sodium sulfate. The dried sample was placed in another round bottom flask and placed on the rotary evaporator to remove excess toluene. The sample was then placed in a beaker and further evaporated by placing in the vacuum oven. Distillation in vacuo was performed with a boiling point range of 133° to 141° C. at 2 mm Hg.
5. A sample of the acetal was analyzed by capillary gas chromatography. No toluene or unreacted propylene glycol could be detected. Approximately 3% of the sample was cinnamic aldehyde, and the remaining sample was CAPGA and its isomers. This identification was confirmed by gas chromatography/mass spectroscopy. There was no standard with which to compare the chemical; but the molecular weight and the fragmentation pattern fit that predicted for CAPGA and its isomers.
6. The amount of acetal recovered was 160.5 g. Because the theoretical weight was 190 g, this process is 84.5% efficient.

Example 2

Two laboratory-scale batches of gum were prepared and were chewed by experienced flavor pan elists. Batches of chewing gum, each weighing 1.2 kg were prepared according to the following formulas:

|  | Control Weight % | Experimental Weight % |
| --- | --- | --- |
| Base | 19.32 | 19.32 |
| Fruit Flavor | 0.72 | 0.72 |
| Corn Syrup | 16.62 | 16.62 |
| Glycerin | 0.87 | 0.87 |
| Sugar | 55.16 | 55.15424 |
| Dextrose Monohydrate | 7.31 | 7.31 |
| CAPGA | — | 0.00576 |

-continued

|  | Control Weight % | Experimental Weight % |
| --- | --- | --- |
|  | 100.0 | 100.0 |

The fruit flavor is a conventional blend of natural flavors, oils and synthetic flavor ingredients. In the experimental batch, the CAPGA was preblended with other ingredients of the fruit flavor to aid in its uniform dispersion in the gum. The level of CAPGA in the blended flavor was about 0.8%. After blending and drying, the gum was cut into uniform pieces for testing.

Next, the two gums were entered into a brief screening test to determine whether more thorough investigation was warranted. The two gums were evaluated by five experienced flavor panelists during four-minute chews. Each panelist was given two coded pieces of gum and was instructed in which order to chew the pieces. About one half of the panelists chewed the control gum first, and about one half of the panelists chewed the experimental gum first. While chewing each piece, each panelist recorded his or her sensations. At the end of the test the codes were revealed, and the panelists compared the control and experimental gums. Three of five panelists selected the experimental gum as having longer-lasting flavor. While this result was not statistically significant, the result was sufficiently positive to undertake more rigorous study.

A larger test employing 24 panelists was conducted. Control and experimental gums were coded and presented in random order to the panelists who chewed each sample for 6 minutes, with a two-minute break between samples. After chewing both, the panelists selected the sample with the longer-lasting flavor. Of the 24 panelists, 17 reported the experimental gum as having longer-lasting flavor. The probability of this occurring by chance is about 3.2%. The experimental gum was also described as having higher "impact" and a more spicy character.

I claim:
1. A chewing gum composition comprising gum base, softener, sweetener and flavor ingredients, said flavor ingredients being present at a level of about 0.1% to about 10% by weight of the gum composition, said flavor ingredients comprising cinnamic aldehyde propylene glycol acetal.
2. The chewing gum composition of claim 1, wherein cinnamic aldehyde propylene glycol acetal is present at a level of about 0.01% to about 100% by weight of the flavor ingredients.
3. The chewing gum composition of claim 1, wherein cinnamic aldehyde propylene glycol acetal is present at a level of about 0.1% to about 60% by weight of the flavor ingredients.
4. The chewing gum composition of claim 1 comprising cinnamon flavor ingredients at a level of about 0.1% to about 4% by weight of the gum composition.
5. The chewing gum composition of claim 4, wherein the cinnamon flavor ingredients comprise cinnamic aldehyde propylene glycol acetal at a level of about 0.01% to about 100% by weight of the flavor ingredients.
6. The composition of claim 4 wherein cinnamic aldehyde propylene glycol acetal is present at a level of about 10% to about 60% by weight of the flavor ingredients.

7. The chewing gum composition of claim 1, comprising fruit-flavored ingredients.

8. The chewing gum composition of claim 7, said flavor ingredients comprising cinnamic aldehyde propylene glycol acetal at a level of about 0.01% to about 60% by weight of the flavor ingredients.

9. The composition of claim 7 wherein the flavor ingredients comprise about 0.4% to about 2% by weight of the gum composition and cinnamic aldehyde propylene glycol acetal at a level of about 0.1% to about 1.2% by weight of the flavor ingredients.

10. A method of manufacturing a chewing gum, comprising the following steps:
providing chewing gum ingredients, comprising gum base, softener and sweetener ingredients;
providing flavor ingredients comprising cinnamic aldehyde propylene glycol acetal;
and mixing the flavor ingredients with the chewing gum ingredients so that the flavor ingredients comprise from about 0.1% to about 10% by weight of the chewing gum.

11. The method of claim 10 wherein the flavor ingredients comprise cinnamic aldehyde propylene glycol acetal at a level of about 0.01% to about 60% by weight of flavor ingredients.

12. The method of claim 10 wherein the chewing gum comprises cinnamon flavor ingredients, the cinnamon flavor ingredients comprising from about 0.1% to about 4% by weight of the chewing gum.

13. The method of claim 12 wherein the cinnamon flavor ingredients comprise cinnamic aldehyde propylene glycol acetal at a level of about 0.01% to about 100% by weight of flavor ingredients.

14. The method of claim 12 wherein the cinnamon flavor ingredients comprise cinnamic aldehyde propylene glycol acetal at a level of about 10% to about 60% by weight of flavor ingredients.

15. The method of claim 10 wherein the chewing gum comprises fruit flavor ingredients, the fruit flavor ingredients comprising from about 0.4% to about 2% by weight of the chewing gum.

16. The method of claim 15 wherein the fruit flavor ingredients comprise cinnamic aldehyde propylene glycol acetal at a level of about 0.1% to about 60% by weight of the flavor ingredients.

17. The method of claim 15 wherein cinnamic aldehyde propylene glycol acetal comprises about 0.4% to about 1.2% by weight of the flavor ingredients.

* * * * *